United States Patent
Hund et al.

(10) Patent No.: US 11,543,284 B2
(45) Date of Patent: Jan. 3, 2023

(54) VORTEX FLOWMETER AND METHOD FOR OPERATING A VORTEX FLOWMETER

(71) Applicant: KROHNE Messtechnik GmbH, Duisburg (DE)

(72) Inventors: Matthias Hund, Duisburg (DE); Tim Baloniak, Herne (DE)

(73) Assignee: KROHNE MESSTECHNIK GMBH, Duisburg (DE)

( * ) Notice: Subject to any disclaimer, the term of this patent is extended or adjusted under 35 U.S.C. 154(b) by 66 days.

(21) Appl. No.: 17/080,894

(22) Filed: Oct. 27, 2020

(65) Prior Publication Data
US 2021/0123790 A1    Apr. 29, 2021

(30) Foreign Application Priority Data
Oct. 29, 2019   (DE) ............... 10 2019 129 177.1

(51) Int. Cl.
*G01F 1/325* (2022.01)
*G01F 25/10* (2022.01)

(52) U.S. Cl.
CPC ............ *G01F 25/10* (2022.01); *G01F 1/3259* (2022.01); *G01F 1/3287* (2022.01)

(58) Field of Classification Search
CPC ....... G01F 1/325; G01F 1/3259; G01F 1/3266
See application file for complete search history.

(56) References Cited

U.S. PATENT DOCUMENTS

| 4,470,310 A | * | 9/1984 | Tsuruoka | G01F 1/3259 73/861.24 |
| 2011/0083515 A1 | | 4/2011 | Phillips | |
| 2014/0176092 A1 | | 6/2014 | Kolonko et al. | |
| 2021/0231472 A1 | * | 7/2021 | Bogdanov | G01F 1/325 |

FOREIGN PATENT DOCUMENTS

DE   102005055285 A1   5/2007

* cited by examiner

*Primary Examiner* — Erika J. Villaluna
(74) *Attorney, Agent, or Firm* — David S. Safran; Calderon Safran & Cole P.C.

(57) ABSTRACT

A vortex flowmeter with at least one measuring tube, at least one bluff body and at least one measuring sensor arranged behind the bluff body, at least one measuring transducer and at least one evaluation unit, wherein the measuring sensor is arranged such that, during operation, it is deflected by the vortices of the medium forming behind the bluff body, wherein the measuring transducer is designed and arranged such that, during operation, it converts the deflection of the measuring sensor into a corresponding change in a measured variable and transmits it as a measured signal to the evaluation unit. The functionality of the measuring transducer can be checked is achieved by an actuator being arranged and controllable by a control unit such that the actuator can deflect and/or deform the measuring transducer and/or the measuring sensor.

18 Claims, 5 Drawing Sheets

VORTEX FLOWMETER AND METHOD FOR OPERATING A VORTEX FLOWMETER

BACKGROUND OF THE INVENTION

Field of the Invention

The invention is based on a vortex flowmeter with at least one measuring tube, with at least one bluff body and with at least one measuring sensor arranged behind the bluff body, viewed in the direction of flow of the medium, with at least one measuring transducer and with at least one evaluation unit, wherein the measuring sensor is arranged such that, during operation, it is deflected by the vortices of the medium forming behind the bluff body, wherein the measuring transducer is designed and arranged such that, during operation, it converts the deflection of the measuring sensor into a corresponding change in a measured variable and transmits it as a measured signal to the evaluation unit.

In addition, the invention relates to a method for operating a vortex flowmeter, wherein the vortex flowmeter has at least one measuring tube, at least one bluff body and at least one measuring sensor arranged behind the bluff body, viewed in the direction of flow of the medium, at least one measuring transducer and at least one evaluation unit, wherein the measuring transducer is arranged such that, during operation, it is deflected by the vortices of the medium forming behind the bluff body, wherein the measuring transducer is designed and arranged such that, during operation, it converts the deflection of the measuring transducer into a corresponding change of a measured variable and transmits it as a measuring signal to the evaluation unit.

Description of the Related Art

Generic vortex flowmeters are known from the state of the art. The velocity of the medium flowing through the measuring tube can be determined from the measuring signal of the measuring transducer, which is triggered by the deflection of the measuring sensor. For this, there is a bluff body in the measuring tube from which vortices of the medium are detached during operation. The vortices are detected by the measuring sensor by a deflection of the measuring sensor. A sensor vane, for example, is arranged in the measuring tube behind the bluff body. In addition, the measuring sensor can also have a membrane, in particular a membrane pocket with a measuring membrane arranged in the membrane pocket, wherein, during operation, the vortices that form deflect or deform the membrane or the membrane pocket and thus the measuring membrane arranged in the membrane pocket. A bluff body is, for example, a cylinder arranged inside the measuring tube, wherein the base area can be triangular, circular or any other geometric shape. Other bluff body shapes are also conceivable and suitable in the scope of the invention.

Within the scope of the present invention, the transducer converts the deflection of the measuring sensor, during operation, into a corresponding change of a measured variable. Depending on the design of the measuring transformer, the detectable measured variable can be, for example, an electrical quantity or also be designed as a measurable deflection of at least a part of the measuring transducer. Depending on the design of the measuring transducer, other measurable variables are also conceivable and suitable for the present application.

In the situation in which the evaluation unit does not receive a measuring signal from the measuring transducer, the user cannot differentiate whether there is no medium flowing through the measuring tube or whether the measuring transducer is defective.

From U.S. Pat. Nos. 6,531,884 B1 and 9,310,412 B2, a diagnosis of the measuring transducer, which in these patents comprises a piezo element, is known in each case, wherein the electrical characteristics of the piezo element are checked in the context of the diagnosis.

SUMMARY OF THE INVENTION

Based on this state of the art, it is the object of the present invention to provide a vortex flowmeter with which the functional activity of the measuring transducer can be checked. Furthermore, it is the object of the invention to provide a corresponding method for operating a vortex flowmeter, which includes checking the functional capability of the measuring transducer.

According to a first teaching of the present invention, the aforementioned object is achieved by a vortex flowmeter described at the beginning by providing an actuator for checking the functionality of the measuring transducer, wherein the actuator is arranged and is controllable by a control unit such that the actuator can deflect and/or deform the measuring transducer and/or the measuring sensor.

If it is stated that the actuator can be controlled by a control unit such that the actuator can deflect and/or deform the measuring transducer and/or the measuring sensor, it is meant that for the purpose of checking the functionality of the measuring transducer, the actuator is controlled such that it deflects and/or deforms the measuring transducer and/or the measuring sensor mechanically. In principle, within the scope of the invention, a deflection is understood to be any deflection from the resting position of the measuring transducer and/or the measuring sensor, in particular, a deflection comprises the excitation of an oscillation of the measuring sensor. Within the scope of the invention, a deformation of the measuring sensor and/or the measuring transducer particularly also comprises the deformation of local areas of at least a part of the measuring transducer and/or the measuring sensor. A compression or an expansion of the measuring transducer and/or the measuring sensor are also deformations in the sense of the invention.

According to the invention, it has been recognized that by detecting the reaction of the measuring transducer in the case of an active deflection and/or deformation of the measuring sensor and/or the measuring transducer by means of an actuator, it can be tested whether the measuring transducer is functional, i.e., whether the measuring transducer generates a measuring signal, preferably an expected measuring signal, from the mechanical deflection and/or deformation and/or whether or to what extent the measuring signal deviates from the expected measuring signal. If the transducer detects the deflection and/or the deformation of the sensor and/or the transducer and if the transducer transmits a corresponding measuring signal to the evaluation unit, it can be assumed that the transducer is functioning. In this case, the situation that the evaluation unit does not receive a measuring signal during operation is due to the fact that no medium is flowing through the measuring tube.

The design according to the invention has the advantage that the measuring transducer can be checked at any time. If the evaluation unit does not receive a measuring signal during operation of the vortex flowmeter, it is possible to test whether the measuring transducer is basically functional by briefly activating the actuator. If, however, a measuring signal is present, it can be checked for plausibility. For example, the deviation of the measuring signal from the expected measuring signal can be determined. For this, the measuring signal can be superimposed with a test signal according to one design, whereby the error-free functionality can be determined.

In addition to the determination that the transducer is basically functional or non-functional, the evaluation of the absolute value of the measuring signal can also be used to determine an aging of the measuring transducer. If, for example, the value of the measuring signal deviates from the expected value, this can be taken as an indication that the measuring transducer must be replaced soon.

According to a preferred design, the sensor has an interior space, wherein the transducer and/or the actuator is/are at least partially located in the interior space of the sensor. In particular, the interior of the sensor is at least partially filled with a casting compound and/or a fluid, preferably a suspension.

According to an advantageous design, the transducer has at least one piezo element. Preferably, the at least one piezo element is connected to the measuring sensor such that a deflection of the measuring sensor causes a deformation and/or a displacement of the piezo element, wherein, during operation, an electrical signal is generated and transmitted as a measuring signal to the evaluation unit. According to a further design, the transducer comprises at least two piezo elements which can independently detect the deflection of the measuring sensor during operation.

According to a next design, the deflection of the sensor is determined by the transducer during operation by means of a preferably optical sampling signal. For this, the measuring transducer has a transmitting unit for transmitting the sampling signal and at least one receiving unit for receiving the sampling signal. The transmitting unit transmits the sampling signal into the interior of the measuring sensor, where it is reflected by a reflecting element, for example by a mirror. The reflecting element is arranged such that a deflection of the measuring sensor causes a deflection of the reflecting element. In this respect, a deflection of the measuring sensor can be perceived during operation as a deflection of the sampling signal at the receiver. For example, the transmitting unit is designed as a laser and the at least one receiving unit is designed as a photodiode, in particular as a two-quadrant diode or as a four-quadrant diode.

According to another design, the optical sampling signal is transmitted to the receiving unit via an optical fiber. According to this design, the fiber is arranged such that in case of a deflection of the sensor, the optical fiber is compressed, stretched or deflected, which measurably changes the properties of the fiber.

According to a further design, the sampling signal can also be an acoustic signal.

According to a next design, the deflection of the sensor is determined inductively during operation by means of a preferably needle-shaped transmitting element. For this, the measuring transducer has an inductive detection unit comprising at least one pair of magnetic coils, wherein, during operation, the deflection of the measuring sensor is determined by changing the distance of the pair of magnetic coils.

In the context of the invention, a magnet-coil pair is understood to be a unit consisting of a magnet and a coil, wherein one component, i.e., the magnet or the coil, is arranged on the movable transmitting element and wherein other component, i.e., the coil or the magnet, is arranged in the effective range of the first component on a spacer which is immovable with respect to the measuring tube and which is connected to the measuring tube and/or the measuring sensor.

The previously described designs of the measuring transducer can also be combined with each other.

According to another advantageous design, the actuator has direct contact with the measuring sensor at least at the time of deflection and/or deformation of the measuring sensor. It is especially preferred that the actuator is directly at the measuring sensor or in the measuring sensor. Preferably, the actuator is permanently connected directly to the measuring sensor.

According to another design, the actuator is indirectly connected to the measuring sensor. For example, the actuator is arranged in the interior of the measuring sensor and connected to the measuring sensor by means of a casting compound.

According to a particularly preferred design, the actuator has a mechanical coupling with the measuring sensor so that the deflection and/or deformation of the measuring sensor by the actuator is caused by a mechanical force According to a next design, the actuator is directly connected to the transducer at least at the time of deflection and/or deformation of the transducer. According to this design, the actuator can directly deform and/or deflect the transducer, whereby a measuring signal is generated and transmitted in the case of functionality of the transducer.

According to one design, the actuator is permanently connected directly to the transducer. This design includes, for example, the arrangement that, in the case that the measurement transducer has at least two piezo elements, the piezo elements are arranged directly on top of each other, wherein one piezo element is controlled at least temporarily as an actuator. According to this arrangement, in a first state the second piezo element can be controlled as an actuator, wherein the first piezo element detects the deformation of the second piezo element through the direct contact and transmits it as a corresponding measuring signal to the evaluation unit. In a second state, the functional modes of the piezo elements are exchanged with regard to the design as actuator or measuring transducer, so that, in the result, both piezo elements can be checked with regard to their functionality.

According to a next design, the actuator is indirectly connected to the measuring transducer. For example, the actuator is located in the interior of the sensor and connected to the transducer via a casting compound.

According to a particularly preferred design, the actuator has a mechanical coupling with the transducer so that the deflection and/or deformation of the transducer by the actuator is caused by a mechanical force.

The actuator is preferably designed as hydraulic actuator and/or as pneumatic actuator and/or as electric actuator and/or as electromagnetic actuator. The generation of a force acting on the measuring transducer and/or the measuring sensor when the actuator is actuated can be effected in any conceivable way which is suitable within the scope of the present invention.

According to a particularly preferred design, the actuator comprises at least one piezo element and/or at least one vibration motor and/or at least one pair of coils wound in opposite directions and/or at least part of the measuring transducer.

In a further design, the actuator comprises a single coil, wherein the coil has hollow spaces between the windings. In another design, the actuator has two coils wound in the same direction. According to another design, the actuator comprises one coil and a permanent magnet.

If the actuator comprises at least one piezo element or if the actuator is designed as a piezo element, the transducer preferably also comprises a piezo element which is directly or indirectly connected, in particular mechanically coupled, to the piezo element of the actuator. A deformation of the piezo element acting as actuator by applying a voltage then acts mechanically on the piezo element of the measuring transducer. In the case of functionality, this piezo element generates an electrical signal and transmits it as a measuring signal to the evaluation unit.

According to a next design, a piezo element is provided overall, which acts both as an actuator and as a measuring transducer. According to this design, one of the piezo elements is first controlled as an actuator by briefly applying a voltage to the measuring transducer such that the sensor is deflected. Then the piezo element as a transducer mechanically detects the subsiding of the deflection of the sensor and transmits the electrical signal generated in this manner as a measuring signal to the evaluation unit.

If the actuator includes at least one vibration motor or if the actuator is designed as a vibration motor, the actuator is preferably arranged on the measuring sensor or in the measuring sensor. If the vibration motor is arranged in the interior of the measuring sensor, the electric motor is preferably arranged at least partially in the casting compound and the eccentric weight driven by the electric motor during operation is arranged in a hollow space of the casting compound so that the eccentric weight can rotate freely during operation to generate the vibration.

According to a further design, the actuator comprises at least one pair of coils wound in opposite directions. The coil pair is arranged such that the coils repel each other when a current flows through them. In this way, a mechanical force acting on the sensor and/or the transducer can also be generated.

According to a next design, the actuator comprises at least a part of the measuring transducer. This design includes, in particular, the arrangement in which the transducer has one or at least two piezo elements.

According to a second teaching of the present invention, the object mentioned above is achieved by an above described method for operating a vortex flowmeter by providing an actuator for checking the functionality of the measuring transducer, wherein the actuator is arranged and can be controlled by a control unit such that the actuator can deflect and/or deform the measuring transducer and/or the measuring sensor and that the method comprises the following steps:
  controlling the actuator so that the actuator deflects and/or deforms the measuring transducer and/or the measuring sensor,
  detecting the deflection and/or the deformation by the transducer as a change of a corresponding measured variable and transmitting a measuring signal to the evaluation unit and
  evaluating the measuring signal by the evaluation unit.

The functionality of the measuring transducer can be checked in so far as a measuring signal is passed on to the evaluation unit in case of an active deflection and/or deformation of the measuring sensor and/or the measuring transducer. If the evaluation unit does not receive a measuring signal despite active deflection and/or deformation of the measuring sensor and/or the measuring transducer, this is an indication of a defect or malfunction of the measuring transducer.

The vortex flowmeter is designed particularly advantageously according to one of the previously described designs.

According to an advantageous design of the method, the actuator sets the measuring sensor into oscillation to check the functionality of the measuring transducer.

It is particularly advantageous that the active deflection and/or the active deformation of the measuring transducer and/or the measuring sensor by the actuator continues during the evaluation of the measuring signal by the evaluation unit. According to this design of the method, the deflection and/or the deformation of the measuring sensor and/or the measuring transducer and the evaluation by the evaluation unit take place simultaneously.

Alternatively, the active excitation and/or the active deformation of the measuring transducer and/or the measuring sensor by the actuator takes place before the evaluation in terms of time, so that the evaluation of the measuring signal detects subsiding of the deflection and/or the deformation. This design is particularly advantageous if the active deflection and/or the active deformation of the transducer and/or the measuring sensor is caused by the transducer itself. For example, the sensor can be deflected by a piezo element acting as a transducer, which can also be operated as an actuator, and then the subsiding of the vibration of the sensor can be detected by the piezo element now acting as a transducer. This evaluation is particularly advantageous in that no further elements are required for deflection and/or deformation of the sensor and/or the transducer.

According to a further design of the method, the evaluation of the measuring signal is carried out by comparing the measuring signal with an expected measuring signal. If the measured measuring signal deviates from the expected measuring signal, this is an indication of a defective measuring transducer. In this respect, not only the complete defect case can be detected, but also an imminent defect or malfunction can be detected early by a deviation of the measuring signal from the expected measuring signal, taking into account a tolerance range.

An equally advantageous method is characterized in that, in the case of a functioning measuring transducer, the actuator is controlled by the control unit such that the amplitude of the deflection and/or the deformation assumes different values, wherein the evaluation unit determines a relationship between the amplitude of the deflection and/or the deformation and the measuring signal, preferably the proportionality factor. This method follows the method for checking the functionality of the measuring transducer. It is advantageous to determine the proportionality factor between the action of force and the signal strength of the measuring signal. By regularly determining or checking the proportionality factor, it can be ensured that aging phenomena which influence this proportionality factor, such as corrosion of the contact surfaces, are taken into account when measuring the flow rate.

In detail, there is now a plurality of possibilities for designing and further developing the vortex flowmeter and the method according to the invention as will be apparent the following description of preferred embodiments in connection with the accompanying drawings.

DETAILED DESCRIPTION OF THE DRAWINGS

Figure 1:
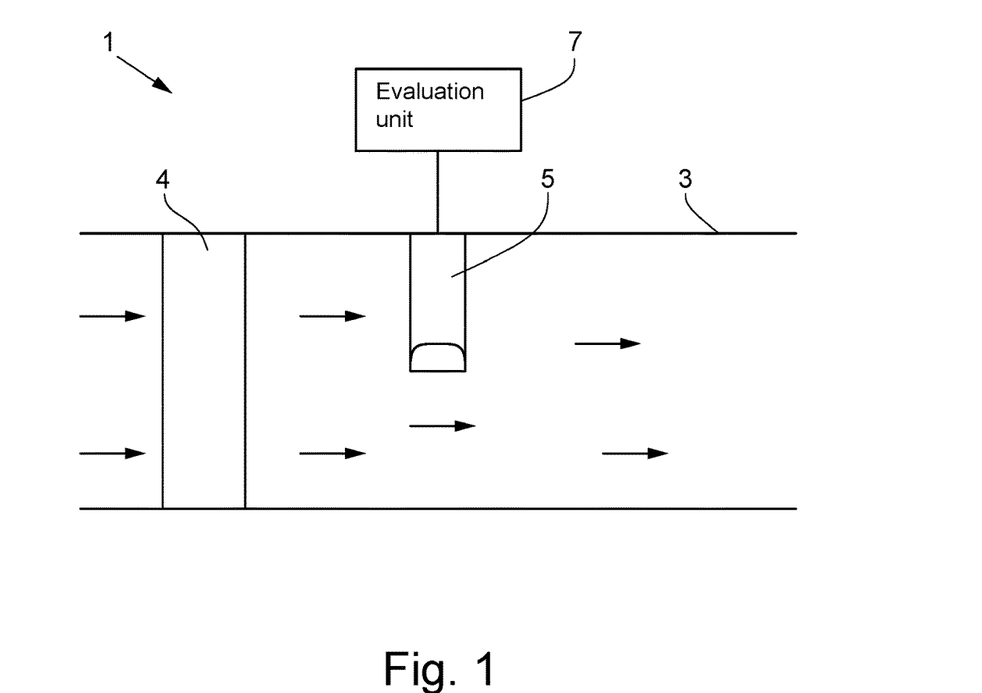
FIG. 1 shows a first embodiment of a vortex flowmeter according to the invention.

FIG. 1 shows an embodiment of a vortex flowmeter 1 with a measuring tube 3, with a bluff body 4 and with a measuring sensor 5 arranged behind the bluff body 4, viewed in the direction of flow of the medium, which is arranged such that it is deflected during operation by the vortices forming behind the bluff body 4 in the medium. In addition, there is a measuring transducer 6, which is not shown in detail here, and an evaluation unit 7, which is connected to the measuring transducer 6. The measuring transducer 6 is designed and arranged such that, during operation, it converts the deflection of the measuring sensor 5 into a corresponding change of a measured variable and transmits it as a measuring signal to the evaluation unit 7. In addition, an actuator 8 for checking the functionality of the measuring transducer 6 is provided, which is also not described in detail here, wherein the actuator 8 is arranged and can be controlled by a control unit 9 such that the actuator 8 can deflect and/or deform the measuring transducer 6 and/or the measuring sensor 5.

Different designs of the measuring transducer 6 and the actuator 8 are shown in detail in the following embodiments.

Figure 2:
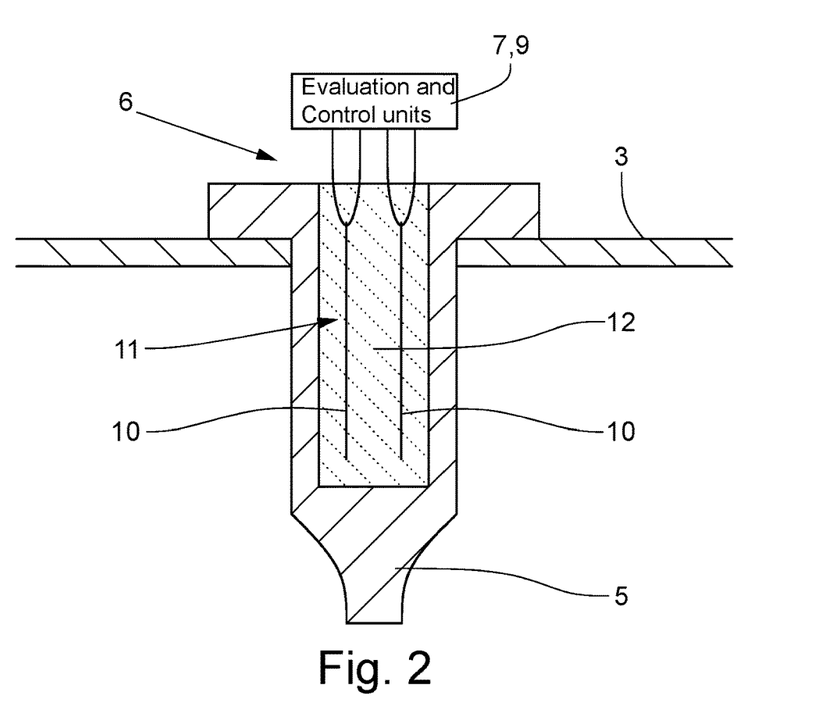
FIG. 2 shows a second embodiment of a vortex flowmeter according to the invention.

In the embodiment shown in FIG. 2, the measuring transducer 6 has two piezo elements 10, which can be controlled by a control unit 9 and which are also connected to an evaluation unit 7. The piezo elements 10 are both arranged in an interior 11 of the measuring transducer 5, wherein the interior 11 is filled with a casting compound 12. In order to check the functionality of the measuring transducer 6, a piezo element 10 is now controlled as an actuator during operation such that this piezo element deforms, wherein this mechanical deformation is mechanically transmitted to the second piezo element 10 via the casting compound 12, and wherein the second piezo element 10 sends an electrical signal to the evaluation unit 7 in the case of functionality due to the mechanical deformation. Subsequently, the functions are exchanged to check the other piezo element 10, i.e., the second piezo element 10 acts as actuator 8 and the first piezo element 10 is deformed by the second piezo element 10 due to the mechanical coupling via the casting compound 12. Based on this deformation, the first piezo element 10 sends an electrical signal to the evaluation unit 7 in the case of functionality.

Figure 3:
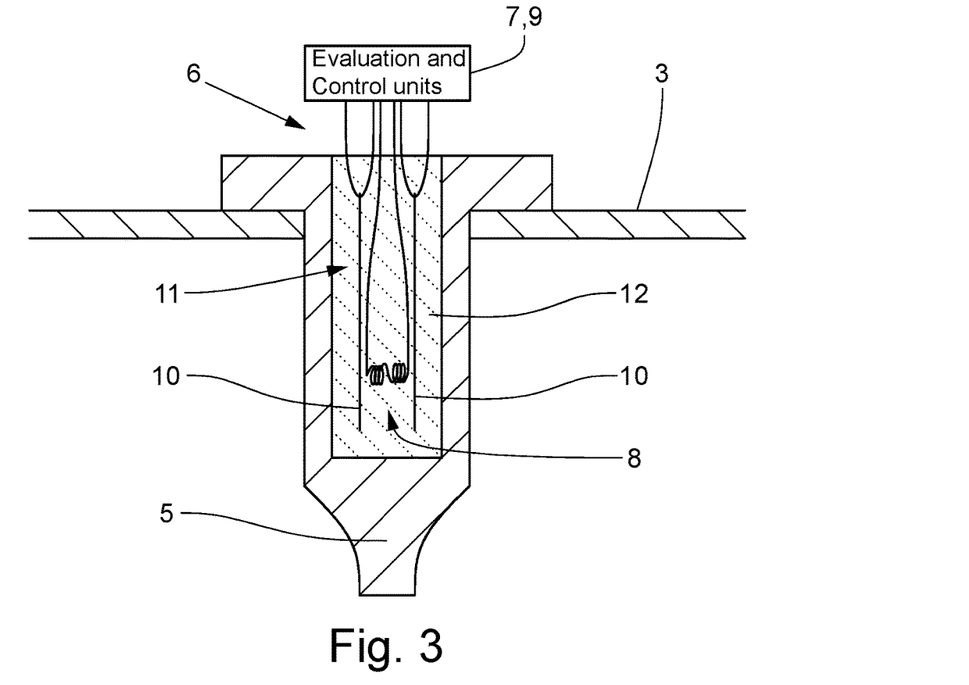
FIG. 3 shows a third embodiment of a vortex flowmeter according to the invention.

In the embodiment shown in FIG. 3, the measuring transducer 6 also has two piezo elements 10 arranged in the interior 11 of the measuring transducer 5, wherein the interior 11 is filled with a casting compound 12. The actuator 8 is designed as a pair of two coils 13 wound in opposite directions, which can be supplied with current via a control unit 9. To check the functionality of the measuring transducer 6, i.e., in detail of the two piezo elements 10, an alternating current is briefly applied to the pair of oppositely wound coils 13, whereby the coils repel each other due to the oppositely wound coils and exert a force on the piezo elements 10 via the casting compound 12. In the case of functionality, each piezo element 10 sends an electrical signal to the evaluation unit 7.

Figure 4:
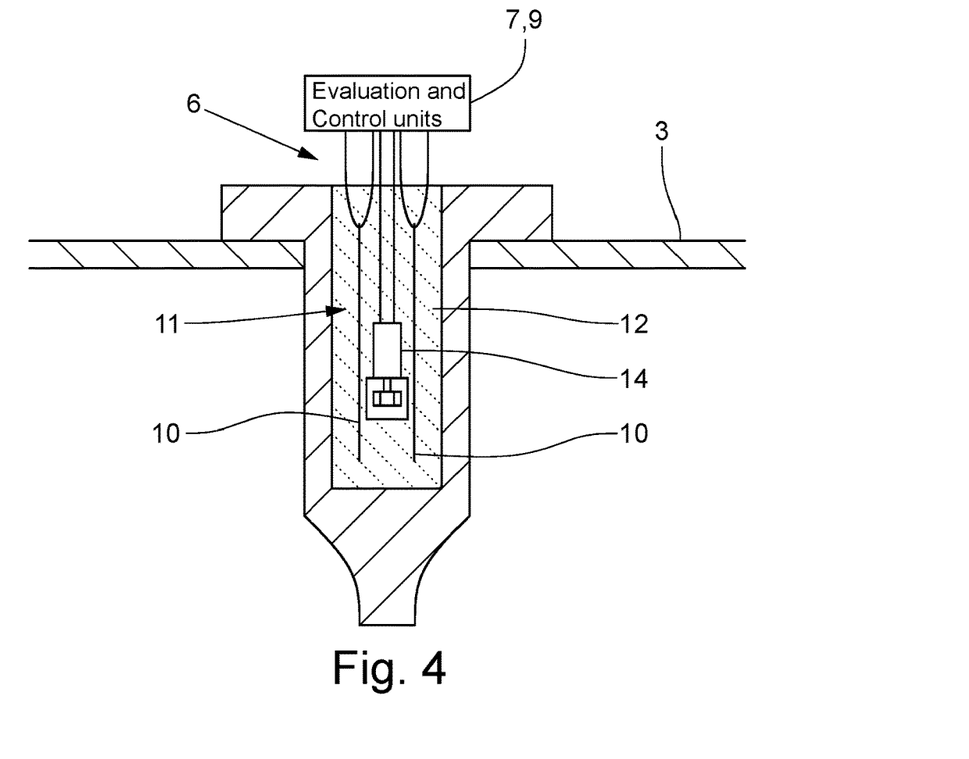
FIG. 4 shows a fourth embodiment of a vortex flowmeter according to the invention.

In the embodiment shown in FIG. 4, the measuring transducer 6 also has two piezo elements 10 arranged in the interior 11 of the measuring sensor 5. The actuator 8 comprises a vibration motor 14 also arranged in the casting compound 12 which can be controlled by a control unit 9 such that it sets the measuring sensor 5 into vibration. For this, an eccentrically arranged weight is provided in a hollow space of the casting compound 12, which can be set in rotation by means of the electric motor. In the case of functionality, the piezo elements 10 detect the deflection or vibration of the measuring sensor 5 and transmit a corresponding measuring signal to the evaluation unit 7.

Figure 5:
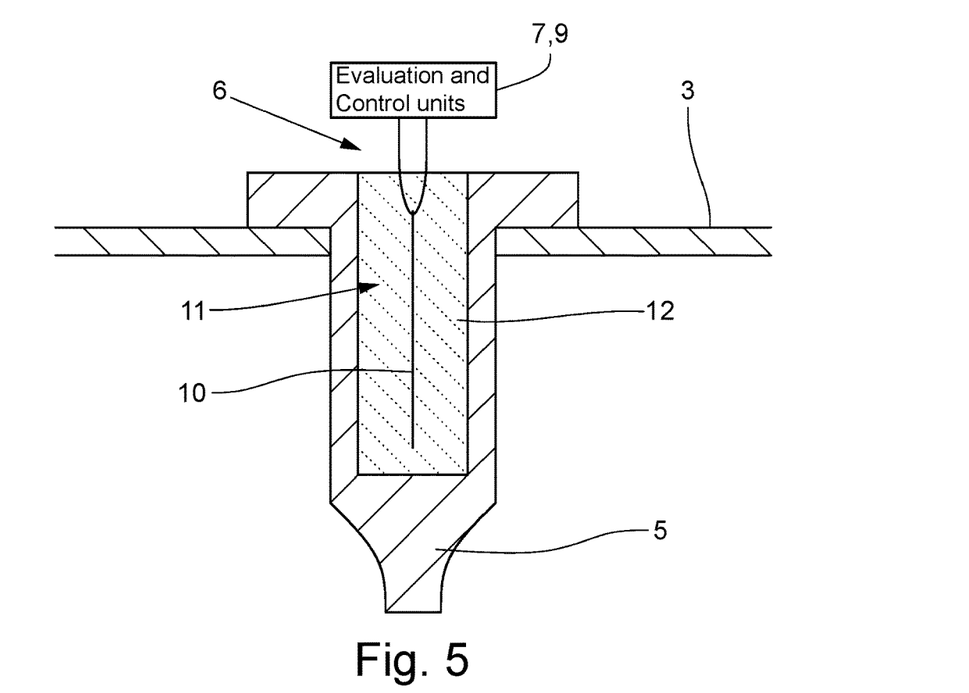
FIG. 5 shows a fifth embodiment of a vortex flowmeter according to the invention.

In the embodiment shown in FIG. 5, the measuring transducer 6 has exactly one piezo element 10, which is also arranged inside the measuring sensor 5 in a casting compound 12. To check the functionality of the measuring transducer 6, the piezo element 10 is operated as actuator 8 in a first step by the control unit 9, so that after applying a voltage to the piezo element 10, the measuring sensor 5 is deflected. In a subsequent step, the piezo element 10 detects the subsiding of the measuring sensor 5 as a measuring transducer 6 and transmits a corresponding measuring signal to the evaluation unit 7.

Figure 6:
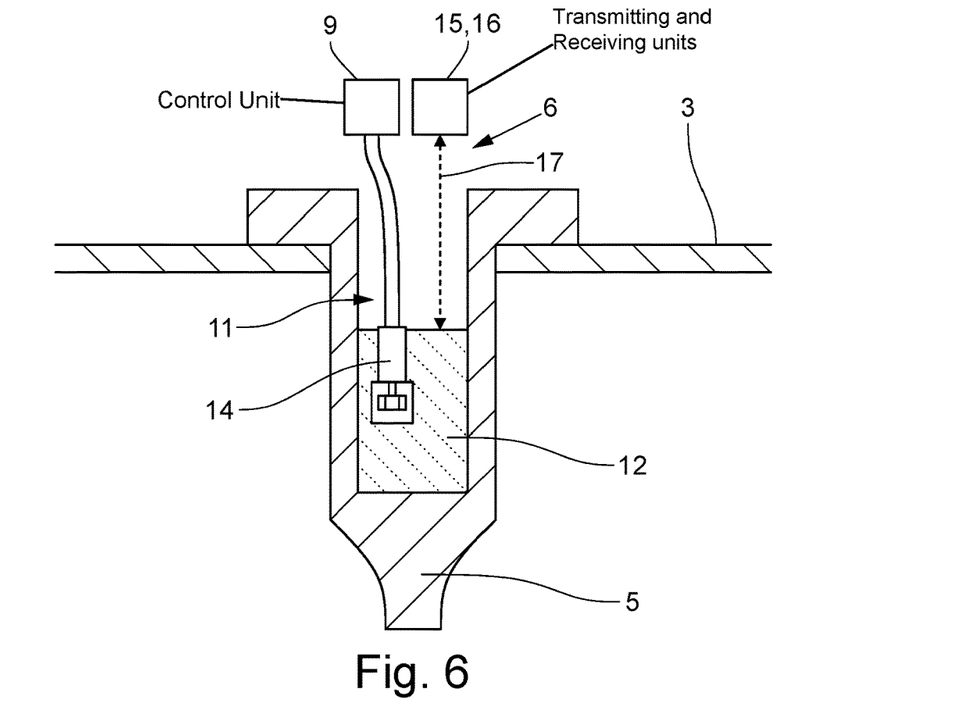
FIG. 6 shows a sixth embodiment of a vortex flowmeter according to the invention.

The measuring transducer 6 shown in FIG. 6 comprises a transmitting unit 15 for transmitting an optical signal 17 and a receiving unit 16 for receiving the optical signal 17, wherein the transmitting unit 15 and the receiving unit 16 are arranged such that the optical signal 17 is transmitted into the interior 11 of the measuring sensor 5 and that the optical signal 17 impinges on the receiving unit 16 after a reflection at a reflection element 18 which is arranged in the interior 11 of the measuring sensor 5. In the embodiment shown, the path of the optical signal is V-shaped, wherein the transmitting unit 15 and the receiving unit 16 are arranged one behind the other. The reflection element 18 is arranged such that a deflection of the measuring sensor 5 also causes a deflection of the reflection element 18, so that the deflection of the measuring sensor 5 can be detected as a deflection of the optical signal 17 at the receiving element 16. The actuator 8 is designed as a vibration motor 14, wherein the vibration motor 14 is arranged in a casting compound 12 in the interior 11 of the measuring sensor 5. To check the functionality of the measuring transducer 6, the vibration motor 14 sets the measuring sensor 5 into vibration, which can be detected by the optical signal 17 at the receiving unit 16.

Figure 7:
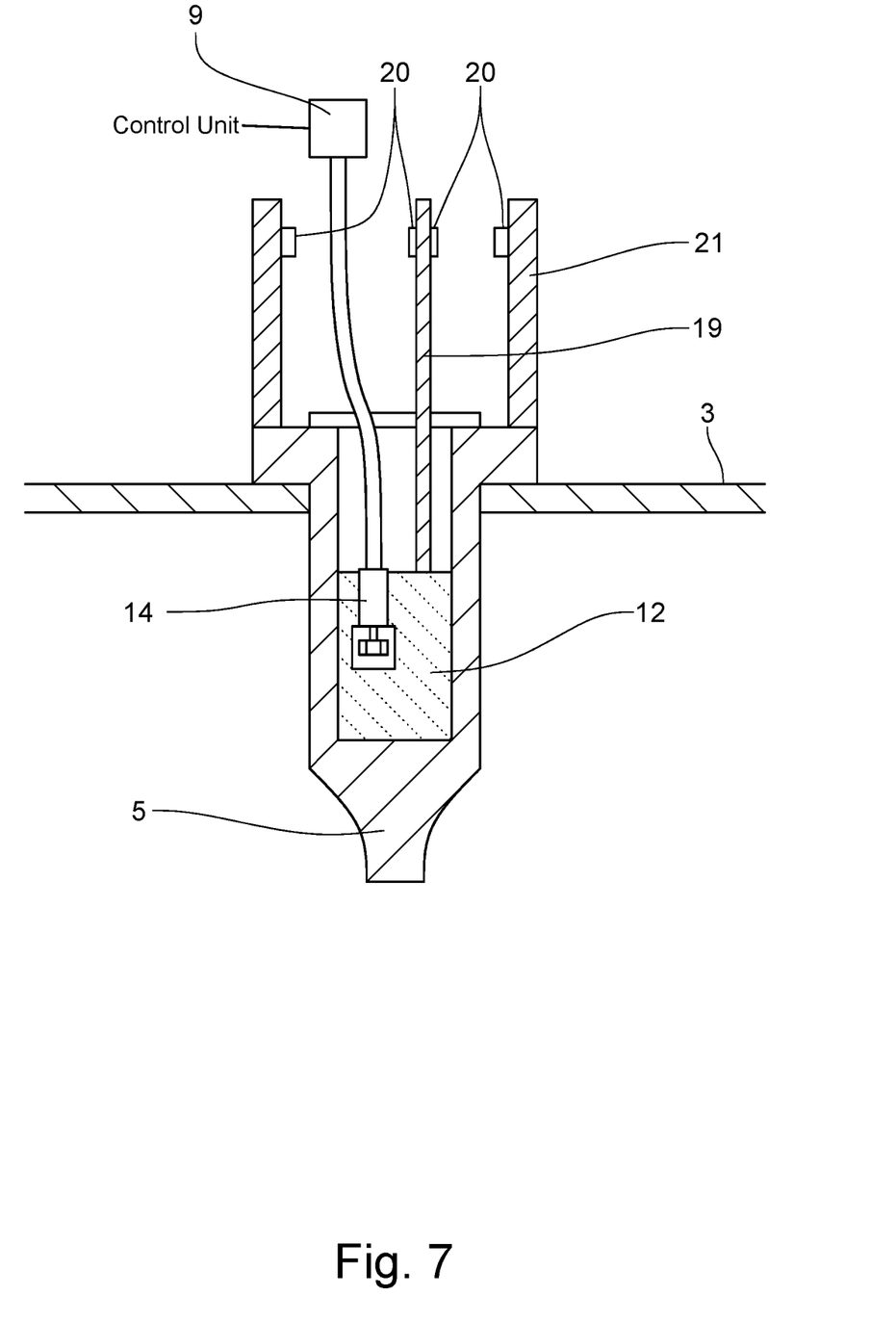
FIG. 7 shows a seventh embodiment of a vortex flowmeter according to the invention.

FIG. 7 shows an embodiment in which the actuator 8, as shown above, is also arranged as vibration motor 14 in a casting compound 12 inside the measuring sensor 5 and can thus cause the measuring sensor 5 to oscillate. The measuring transducer 6 has a transmitting element 19, wherein the transmitting element 19 is connected to the casting compound 12, so that a deflection of the measuring sensor 5 or the casting compound 12 causes a deflection of the transmitting element 19. At a distance from the measuring tube, the deflection of the transmitting element 19 is detected inductively via the change in the distance of a magnet-coil pair 20, wherein in each case one component of the magnet-coil pair 20, i.e., the magnet or the coil, is arranged in a fixed position on a spacer 21 and the other component, i.e., the coil or the magnet, is arranged on the deflectable transmission element 19.

Figure 8:
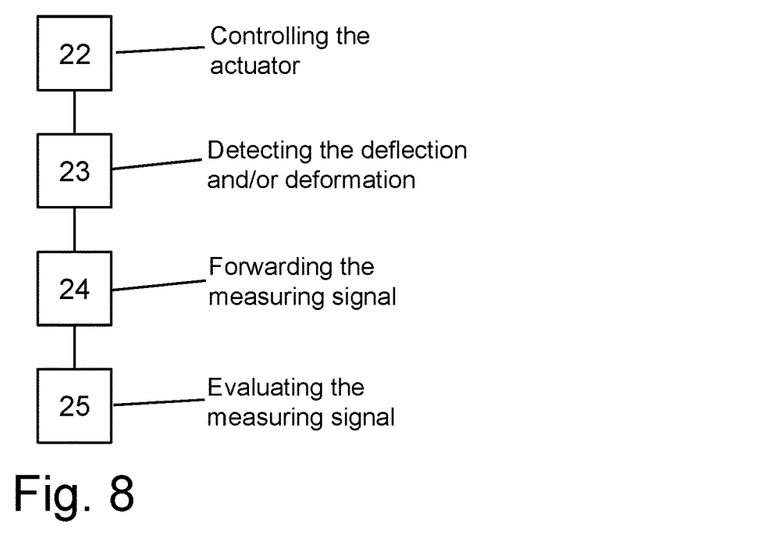
FIG. 8 is a flow chart of a first embodiment of a method according to the invention.

FIG. 8 shows a first embodiment of a method 2 for operating a vortex flowmeter 1, wherein the vortex flowmeter 1 is designed according to one of the embodiments shown in FIGS. 1 to 7. A method for checking the measuring transducer 6 is shown in detail. In a first step 22, the actuator 8 is controlled such that the actuator 8 deflects and/or deforms the measuring transducer 6 and/or the measuring sensor 5.

In the case of functionality of the measuring transducer 6, the measuring transducer 6 detects the deflection and/or the deformation in a next step 23 and forwards 24 this as a measuring signal to the evaluation unit 7. The evaluation unit 7 evaluates 25 the measuring signal.

In detail, evaluation 25 can consist of comparing the measured measuring signal with an expected measuring signal. If the measured measuring signal differs from the expected measuring signal, this can be interpreted as an indication that the measuring transducer 6 is basically working, but also shows signs of wear or has to be replaced soon due to aging.

In a design of the shown method 2, the deflection and/or the deformation by the actuator 8 continues during evaluation 25. In another design of the method shown, the actuator 8 briefly deflects and/or deforms the measuring sensor 5 and/or the measuring transducer 6, wherein evaluation 25 comprises the measurement of the decay of this deflection and/or deformation.

Figure 9:
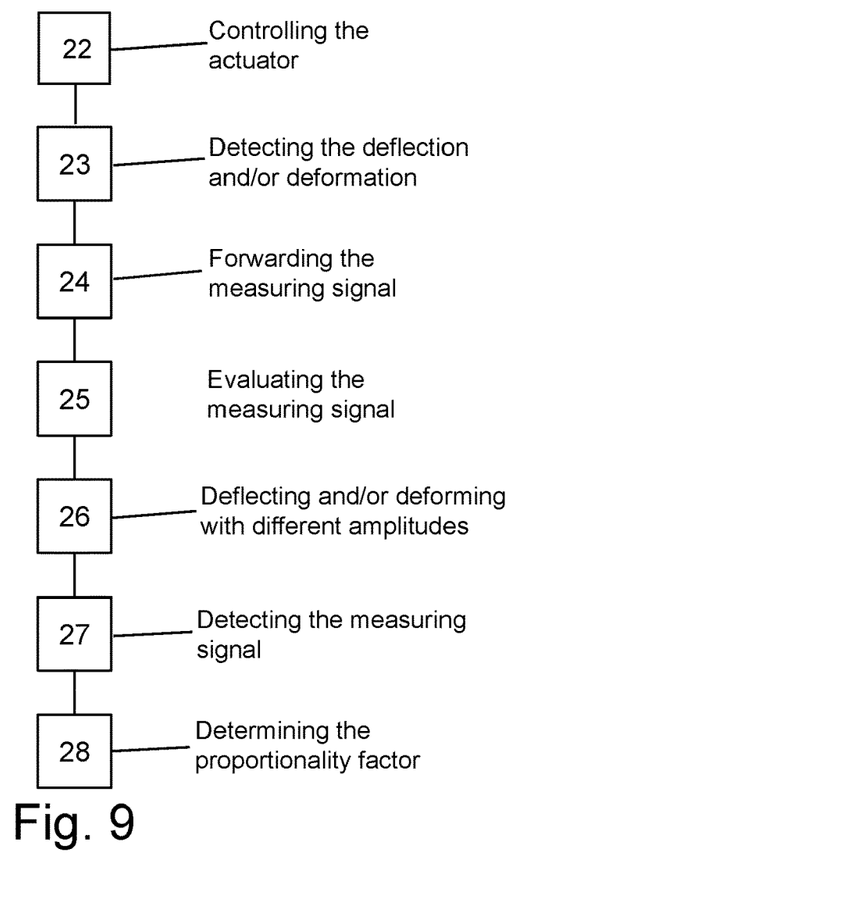
FIG. 9 is a flow chart of a second embodiment of a method according to the invention.

In the embodiment of the method 2 shown in FIG. 9, the basic check of the functionality (steps 22 to 25) is followed by the receiving a correlation between the amplitude of the deflection and/or deformation and the value of the measuring signal. For this, the measuring transducer 6 and/or the measuring sensor 5 is deflected and/or deformed 26 with different amplitudes and the respective measuring signal is detected in step 27 by the evaluation unit 7. Subsequently, the evaluation unit 7 determines the corresponding proportionality factor in step 28.

This has the advantage that, during operation, the respective present proportionality factor, i.e., the state of the measuring device, can be used as a basis for determining the flow rate.

What is claimed is:

1. A vortex flowmeter, comprising:
at least one measuring tube,
at least one bluff body,
at least one measuring sensor arranged behind the bluff body, viewed in a direction of flow of a medium through a flow passage of the at least one measuring tube,
at least one measuring transducer,
an actuator for checking the operability of the measuring transducer,
a control unit for controlling the actuator, and
at least one evaluation unit,
wherein the at least one measuring sensor is arranged such that, during operation, it is deflectable by vortices of the medium occurring behind the bluff body,
wherein the actuator is arranged such that the actuator is able to deflect and/or deform the measuring transducer and/or the measuring sensor,
wherein the measuring transducer is configured and arranged to be able to convert deflection and/or deformation of the at least one measuring sensor or at least one measuring transducer into a corresponding change in a measured variable and to transmit the change as a measurement signal to the evaluation unit, and
wherein the at least one measuring sensor has an interior space and wherein the actuator is at least partially arranged in the interior space.

2. The vortex flowmeter according to claim 1, wherein the at least one measuring transducer is at least partially arranged in the interior.

3. The vortex flowmeter according to claim 1, wherein the at least one measuring transducer comprises at least one transmitting unit for producing a sampling signal and at least one receiving unit for receiving the sampling signal.

4. The vortex flowmeter according to claim 1, wherein the at least one measuring transducer comprises at least one piezo element.

5. The vortex flowmeter according to claim 1, wherein the at least one measuring transducer comprises at least one transmitting element for an inductive detection unit.

6. The vortex flowmeter according to claim 1, wherein the actuator is positioned in direct contact with the at least one measuring sensor at least at a time of said deflection and/or deformation of the measuring sensor.

7. The vortex flowmeter according to claim 1, wherein the actuator is connected indirectly to the at least one measuring sensor.

8. The vortex flowmeter according to claim 1, wherein the actuator is directly connected to the measuring transducer at least at a time of said deflection and/or deformation of the measuring transducer.

9. The vortex flowmeter according to claim 1, wherein the actuator is connected indirectly to the measuring transducer.

10. The vortex flowmeter according to claim 1, wherein the actuator comprises at least one of at least one piezo element or at least one vibration motor or at least one pair of coils wound in opposite directions or at least part of the measuring transducer.

11. The vortex flowmeter according to claim 1, wherein at least one measuring sensor has a portion that projects from an inner wall of the measuring tube into the flow of the medium and wherein at least part said interior space is in said portion.

12. The vortex flowmeter according to claim 1, wherein the actuator is located within a casting compound that fills the interior space.

13. A method for operating a vortex flowmeter having at least one measuring tube, at least one bluff body and at least one measuring sensor arranged behind the bluff body, viewed in a direction of flow of a medium through a flow passage of the at least one measuring tube, at least one measuring transducer and at least one evaluation unit, wherein the measuring sensor extends into the flow passage such that, during operation, the at least one measuring sensor is deflectable by vortices of the medium occurring behind the bluff body, wherein the measuring transducer is designed and arranged such that, during operation, the at least one measuring transducer is able to convert deflection of the measuring sensor into a corresponding change in a measured variable and to transmit the change as a measured signal to the evaluation unit, and an actuator is for checking the operability of the at least one measuring transducer, the actuator being arranged and controlled by a control unit such that the actuator is able to deflect and/or deform at least one of the at least one measuring transducer or the at least one measuring sensor,
wherein the at least one measuring sensor has an interior space and wherein the actuator is at least partially arranged in the interior space, wherein the method comprises the following steps:
- controlling the actuator in the interior space so that the actuator deflects and/or deforms at least one of the at least one measuring transducer or the at least one measuring sensor,
- detecting the deflection and/or the deformation of the at least one measuring transducer or measuring sensor as a change in a corresponding measured variable and forwarding a measuring signal to the evaluation unit, and
- evaluating the measuring signal with the evaluation unit to determine the operability of the at least one measuring transducer.

14. The method according to claim 13, using the actuator to set the measuring sensor in oscillation to check the functionality of the measuring transducer.

15. The method according to claim 13, wherein at least one of active deflection or active deformation of the at least one measuring transducer or measuring sensor by the actuator continues during the evaluation of the measuring signal by the evaluation unit.

16. The method according to claim 13, wherein the active excitation or the active deformation of the at least one measuring transducer and/or the at least one measuring sensor by the actuator occurs chronologically before the evaluation, so that the evaluation of the measuring signal detects subsiding of the deflection or deformation.

17. The method according to claim 13, wherein the evaluation of the measuring signal is carried out by comparing the measuring signal with an expected measuring signal.

18. The method according to claim 13, wherein, in a case of a functioning measuring transducer, the actuator is controlled by the control unit such that the amplitude of the deflection or the deformation assumes different values, and wherein the evaluation unit determines a relationship between the amplitude of the deflection or the deformation and the measuring signal as a proportionality factor.

* * * * *